United States Patent [19]

Deckers et al.

[11] Patent Number: 4,549,265
[45] Date of Patent: Oct. 22, 1985

[54] METHOD OF AND DEVICE FOR IMAGE RECONSTRUCTION IN COMPUTED TOMOGRAPHY

[75] Inventors: Willem H. M. Deckers; Johannes C. A. Op de Beek, both of Eindhoven, Netherlands

[73] Assignee: U.S. Philips Corporation, New York, N.Y.

[21] Appl. No.: 465,936

[22] Filed: Feb. 14, 1983

[30] Foreign Application Priority Data

Oct. 22, 1982 [NL] Netherlands ............ 8204086

[51] Int. Cl.$^4$ ............................ G06F 15/42
[52] U.S. Cl. .................... 364/414; 378/14; 378/901; 250/363 S
[58] Field of Search ........... 364/414, 415; 378/901, 378/4, 14, 21; 250/363 S

[56] References Cited

U.S. PATENT DOCUMENTS

| | | | |
|---|---|---|---|
| 4,138,611 | 2/1979 | Hounsfield | 364/414 |
| 4,149,249 | 4/1979 | Pavkovich | 364/414 |
| 4,149,259 | 4/1979 | Kowalski | 364/414 |
| 4,275,444 | 6/1981 | Ryan | 364/414 |
| 4,398,251 | 8/1983 | Le May | 364/414 |

FOREIGN PATENT DOCUMENTS

2919776  11/1979  Fed. Rep. of Germany ...... 378/901

Primary Examiner—Jerry Smith
Assistant Examiner—Allen MacDonald
Attorney, Agent, or Firm—Jack E. Haken

[57] ABSTRACT

A method and device for computer tomography in which the same filtering operation can be performed for the image reconstruction, regardless of the method used to measure the measured data. Before and after the filtering the data there is performed a multiplication by a pre-conditioning factor and a post-conditioning factor, respectively. The pre-conditioning and post-conditioning factors are dependent on the type of reconstruction and on the position of a data in the group of measured data. The fact that the same filter can be used is important notably for computer tomography apparatus in which a convolution filter is embodied in circuit hardware. The back-projection device is suitable for the back-projection of measured data along diverging measuring paths as well as measured data along parallel measuring paths with only modification of some constants.

7 Claims, 14 Drawing Figures

METHOD OF AND DEVICE FOR IMAGE RECONSTRUCTION IN COMPUTED TOMOGRAPHY

The invention relates to a method of determining a radiation attenuation distribution in a body section which is irradiated from a plurality of directions by a flat, fan-shaped beam of penetrating radiation which diverges from a source point, all directions extending through a central point and being situated within the body section, for each measuring direction there being determined a group of measured data which are a measure for the radiation attenuation along an associated group of diverging measuring paths, each group of measured data either being convoluted with a group of convolution numbers or being Fourier transformed, filtered and back-transformed, after which the measured data thus treated are back-projected in a matrix of pixels.

The invention also relates to a device for determining a radiation attenuation distribution in a body section, comprising: at least one source for generating a flat, fan-shaped beam of penetrating radiation for irradiating the body along a number of measuring paths which diverge from the source and which are situated in the section from a plurality of source positions which are regularly distributed over at least 180°, a central ray in the diverging beam passing through a central point from each source position, an array of detectors for detecting radiation having passed through the body along the measuring paths in order to supply for each source position groups of measured data which are a measure for the radiation attenuation occurring along the number of diverging measuring paths through the body, a processing device which comprises a memory for the storage of measured data, a filtering device for the filtering of each group of measured data, a back-projection device for the back-projection and assignment of the filtered measured data to matrix elements of a memory matrix for the storage of the sum of the back-projected, filtered measured data, and a display device for the display of the sum of back-projected measured data stored in the memory matrix.

A method and device of this kind are known per se and are suitable for a type of image reconstruction technique. This is to be understood to mean the image reconstruction technique utilizing measured data which belong to groups of parallel measuring paths or measured data which belong to groups of measuring paths diverging from one point. In the former case sorting of measured data is often necessary, because the beam of penetrating (X-ray) radiation emitted by a point source is always a diverging beam. Such sorting requires additional calculation time and also implies a substantial waiting time before all measured data belonging to the group of parallel measuring paths to be formed have indeed be measured. It has been found that the additional calculation time as well as the waiting time are undesirable. In the second case (reconstruction by means of groups of "diverging" measured data) the additional calculation time and waiting time are avoided but, for example, a correction for radiation hardening (as described in the U.S. Pat. No. 4,217,641) is not possible, because such a correction utilizes groups of parallel measured data derived from the already reconstructed image. Obviously, it is possible to determine measured data along diverging measuring paths from a reconstructed image, but a substantial amount of additional calculation time is then required which is, of course, a drawback.

It is the object of the invention to provide a method of and a device for determining a radiation attenuation distribution which are suitable for the processing of parallel (equidistant or not) as well as diverging (equiangular or not) groups of measured data in order to reconstruct an image of the radiation attenuation distribution and which even allow some of said groups of measured data to be incomplete (in some source positions, the body to be examined is then situated partly outside the beam of penetrating radiation).

To this end, a method in accordance with the invention is characterized in that prior to convolution or Fourier transformation, each measured data of a group is multiplied by a pre-conditioning factor which is determined by the cosine of the angle enclosed by a central connecting line between the point source and the central point and the measuring path associated with the measured data to be pre-conditioned, after which the pre-conditioned measured data are either convoluted or Fourier transformed, filtered and back transformed as if the pre-conditioned measured data had been measured as if it were along parallel measuring paths, the convoluted or filtered measured data being multiplied by a post-conditioning factor which is inversely proportional to the variation and directly proportional to the square of the cosine of the angle enclosed by the central ray and the measuring path associated with the convoluted or filtered measured data, after which the measured data thus post-conditioned are back-projected along the measuring paths along which the measured data have been determined.

To this end, a device in accordance with the invention is characterized in that the processing device furthermore comprises arithmetic means for multiplying each measured data of each group by a pre-conditioning factor which is determined by the cosine of the angle enclosed by the connecting line between the source and the detector whereby the measured data has been measured and a central connecting line between the source and the central point, and for multiplying each filtered measured data by a post-conditioning factor which is inversely proportional to the variation of the angle enclosed by the central connecting line and the measuring path associated with the filtered measured data, as a function of the associated meaauring path, and which is proportional to the square of the cosine of this angle, the filtering device for the filtering of the preconditioned measured data being a filtering device for the filtering of parallel and equidistantly measured values, the back-projection device comprising means for multiplying a filtered, post-conditioned measured data by a distance factor which is inversely proportional to the square of the distance between a source point and a projection point of a pixel which is situated on the central connecting line and in which a back-projection is determined. The method and the device in accordance with the invention enable the use of each time the same filtering (via convolution or Fourier transformation), each measured data being multiplied by a pre-conditioning factor prior to filtering and by a post-conditioning factor after filtering, the pre-conditioning and post-conditioning factors being dependent on the type of reconstruction and on the relative position of a measured data within the group of measured data. The possibility of using only one type of filtering for all types of reconstruction is notably important for a device for performing the method in which the (convolution) filter is implemented in an electronic circuit (hardware-wise), so that it cannot be adapted to the type of reconstruction by modification of a computer program. The distance factor to be used for the back-projection of the filtered measured data can be adapted from the diverging type of reconstruction to the parallel type of reconstruction simply by making it equal to one.

The invention will be described with reference to embodiments shown in a drawing, therein:

FIGS. 1a and 1b show, partly in the form of a block diagram, the device in accordance with the invention, FIG. 2 diagrammatically shows a customary arrangement of the radiation source and the detectors with respect to one another, FIG. 3 diagrammatically shows a further arrangement of the radiation source and the detectors with respect to one another, FIG. 4 diagrammatically shows the arrangement of a so-called fourth-generation computer tomography apparatus, FIG. 5 diagrammatically illustrates a back-projection geometry to be used.

Figure 1A:
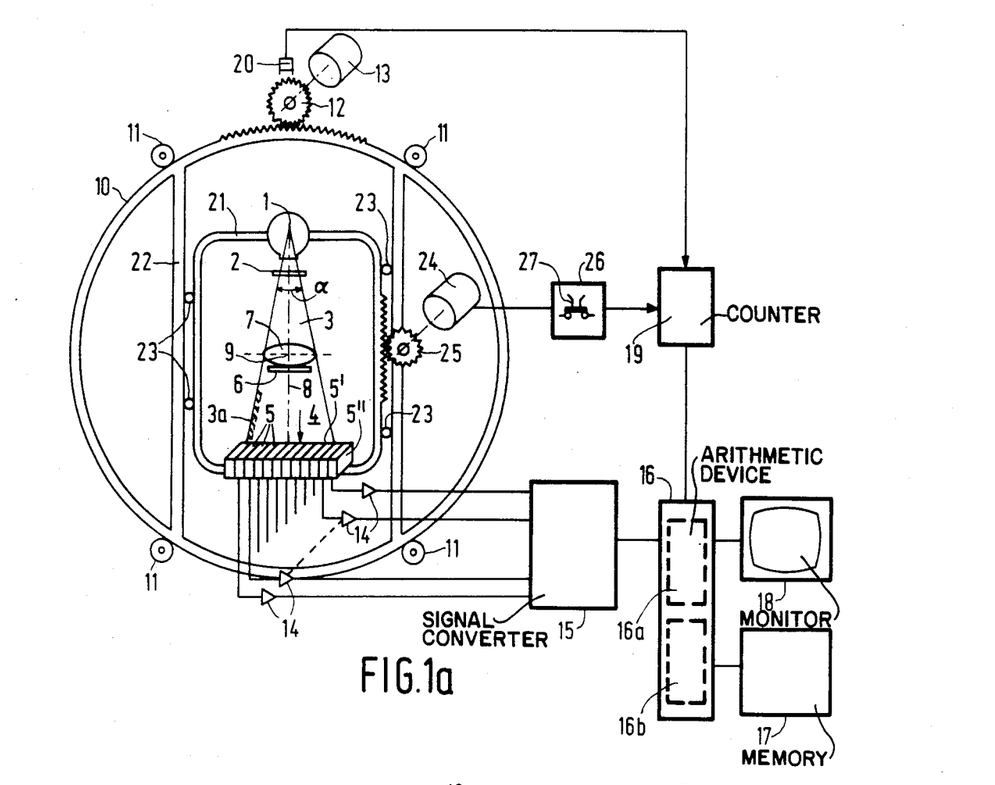

A computer tomography apparatus as diagrammatically shown in FIG. 1a comprises a radiation source 1, preferably formed by an X-ray tube, for generating a flat beam 3 of X-rays which is to be stopped down by a slit diaphragm 2, which diverges through an angle $\alpha$ and which may have a thickness of from 1.5 to 35 mm. The radiation beam 3 is incident on an array 4 of separate detectors 5, each of which measures radiation which reaches the relevant detector 5 via a measuring path 3a. The width of a measuring path and the spacing of the measuring paths determine the spatial accuracy of the scanning and reconstruction of an object 7 which is arranged on a table 6. In order to enhance this accuracy (resolution) in known manner, the detector array 4 may be arranged to be asymmetrical with respect to a central ray 8 which passes from the source 1 through a central (rotation) point 9.

In one embodiment, the central ray 8 is incident on a detector 5 in the centre of the array 4 half-way between the centre and the edge of the detector 5, so that ¼ of the detector 5 is situated to one side whilst ¾ of this detector 5 is situated to the other side of the central ray 8. The detector array 4 comprises, for example, 576 detectors 5, $\alpha$ being 43.2° and the distance between the source 1 and the detector array 4 being 1 m. The array 4 of detectors 5 may be constructed, for example, as an elongate, gas-filled ionization chamber in which flat electrodes are arranged in a row parallel to one another.

The system formed by the radiation source 1 and the detector array 4 may be mounted on a frame 10 which is arranged to be rotatable about the central point 9 so that a slice of the object 7 can be irradiated in different directions (situated in one plane) by radiation beams 3. The frame 10 is guided by means of bearings 11 and is driven by means of a motor 13 and a gear transmission 12. Driving may be continuous, but also intermittent, the radiation source 1 preferably emitting radiation in a pulsed manner in the former case, so that the array 4 of detectors 5 produces a group of measured data for each source position $\theta$ to be chosen.

The groups of measured signals supplied by the detectors 5 are applied, via an amplifier 14, to a signal converter 15 in which the measured data are digitized after which they are presented to an arithmetic device 16. The arithmetic device 16 corrects the measured data for off-set, followed by logarithm formation and calibration on the basis of logarithm and calibration tables stored in a memory 17, after which the measured data are stored in the memory 17. An image matrix of the radiation attenuation distribution to be determined by the arithmetic device 16 can be displayed on a display device (monitor) 18. To this end, each group of measured data is treated by a filtering device 16a which performs either a convolution or a Fourier transformation filtering operation and a back-transformation, and subsequently by a back-projection device 16b which distributes the filtered measured data among storage cells of an image matrix stored in the memory 17.

A counter 19 counts the number of pulses generated by a pulse generator 20 during rotation of the frame 10, so that a position of the counter 19 is a measure for the orientation of the frame 10 and hence a measure for the angular rotation $\theta$ of the successive measuring directions which is stored with the group of measured data associated with the angle $\theta$.

It has found that the distance between the radiation source 1 and the object 7 should preferably be adaptable to the size of the object 7. Consequently, the radiation source 1 and the detector array 4 are mounted on a support 21 which is displaceable on guide rails 22 on bearings 23 by means of a gear drive 25 which is coupled to a motor 24. The motor 24 can be driven by means of a switch 27 via a control circuit 26.

Figure 1B:
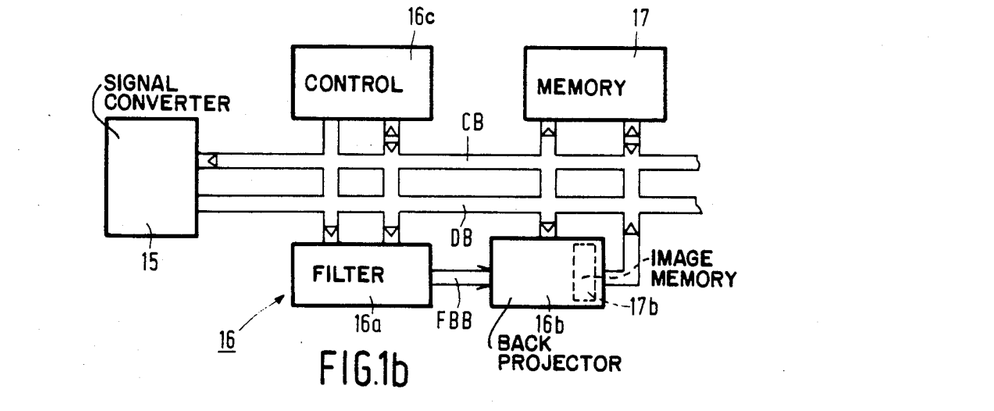

FIG. 1b is a more detailed representation of the arithmetic device 16 of FIG. 1a. The arithmetic device 16 comprises the filtering device 16a, the back-projection device 16b and a control unit 16c which are connected to one another by means of a data bus DB and a control bus CB and also to the memory 17, the signal converter 15, the monitor and an input station for data and control (for the sake of simplicity, the latter two have been omitted because they are known per se). The measured data stored in the memory 17 are applied, via the data bus DB, to the filtering device 16a in which they are treated in order to be applied, via a separate data bus FDB, to the back-projection device 16b. After having treated the data to be back-projected, the back-projection device 16b returns the back-projected data to the memory 17 via the data bus DB. The back-projection device 16b preferably comprises its own image memory 17b which is directly accessible and in which the back-projected image data are stored. Thus, the data bus DB need be used only after the reconstruction of a complete image of the radiation attenuation distribution. Because the image memory 17b is directly accessible (i.e. much faster than the memory 17), image reconstruction can be performed in a shorter period of time.

Figures 2, 3, 4:
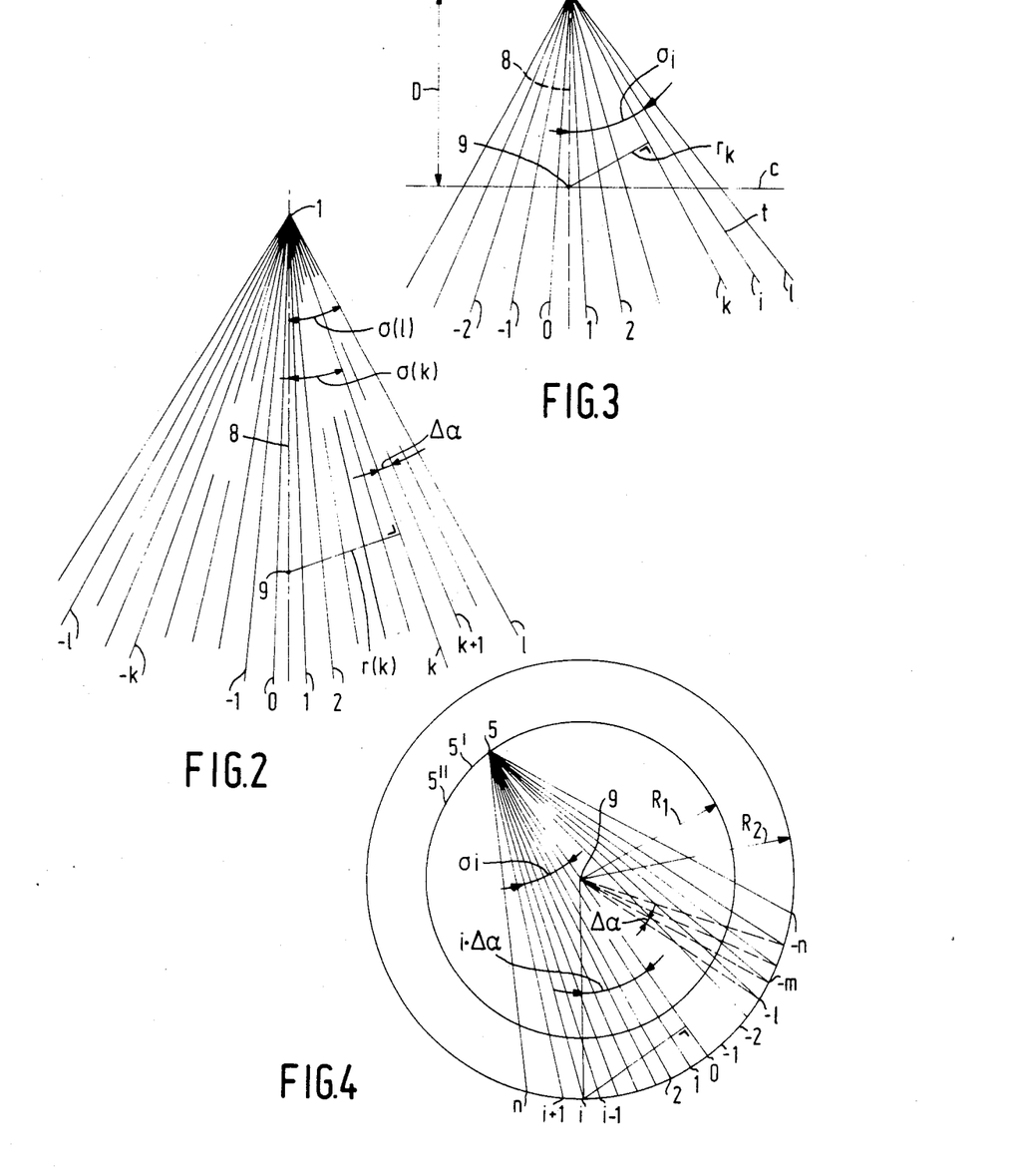

FIG. 2 diagrammatically shows the arrangement of the X-ray source 1 with respect to the detectors 5 which are preferably situated on an arc of circle whose centre is situated in the point source 1. The measured data of the radiation attenuation p(r') have been measured along a number of measuring paths ($\ldots$, $-1$, $-k$, $\ldots$, $-2$, $-1$, $0$, $+1$, $+2$, $\ldots$, $+k$, $+1$, $\ldots$) which extend at a distance r' from the central point 9 and which are symmetrically distributed with respect to the central ray 8. Even though the measuring paths are shown to be equiangular in FIG. 2, the following derivation is not restricted thereto. The convoluted value p(r) associated with a measuring path (k) at a distance r(k) from the central point 9 can be expressed in a general convolution formula as follows:

$$\hat{p}(r) = \int_{r'} /q(r - r') \cdot p(r') \cdot dr' \quad (1\text{-}1)$$

where: $q(r-r')$ is a weighting factor from a series of convolution numbers yet to be determined, the integral being a function of the variable r'. Formula (1-1) can also be written as a function of a variable k:

$$\hat{p}(r) = \int_k q(r - r') \cdot p(r') \cdot \frac{d\,r(k)}{d\,k} \cdot d\,k \quad (1\text{-}2)$$

Formule (1-2) can be rewritten for the discrete situation shown in FIG. 1 as follows:

$$\hat{p}(l) = \sum_k q(l - k) \cdot p(k) \cdot d\,r(k)/d\,k \quad (1\text{-}3)$$

where dr(k)/dk is the Jacobian, $\hat{p}(l)$ is the convoluted value p associated with the measuring path l, $q(l-k)$ is a weighting factor which depends on the index difference between the measuring paths l and k, and $p(k)$ is the measured values measured along the measuring path having the index k.

Now, $q(l-k)$ is a weighting factor which depends on the variable $(l-k)$, so that the following expression may be substituted for $q(l-k)$:

$$q(l - k) = R_N{}^2 \cdot [2 \operatorname{sinc} \pi (l - k) - \operatorname{sinc}^2 \pi (l - k)/2] \quad (1\text{-}4)$$

assuming that $R_N = (2.s)^{-1}$ and $(r-r')=s \cdot (l-k)$, in which the term between [.] represents a standardized, dimension-less known convolution factor series which depends only on the variable $(l-k)$ and which will be denoted hereinafter as Ramp $(l-k)$ for reasons yet to be described, the variable $R_N$ being equal to $(2.s)^{-1}$, the variable s being the mean length of arc at a given point between two measurements of a group (if the measuring paths were parallel and equidistant at a distance a, $R_N$ would amount to $(2a)^{-1}$). When the angle $\Delta\alpha$ enclosed by two neighbouring measuring paths k and $k-1$ is sufficiently small, the length of arc s is substantially equal to the shortest straight line passing through a point between the two measuring paths.

This length of arc s on a measuring path k at a distance U from the source point 1 is:

$$s(k, U) = U \cdot \left( \frac{d\sigma(H)}{d\,H} \right)_H = k = U \cdot \frac{d\sigma(k)}{d\,k} \quad (1\text{-}5)$$

in which $\sigma(k)$ is the angle enclosed by the central ray 8 and the measuring path k.

The mean length of arc in the area between the measuring path k and l is defined as $\bar{s}$ (l, k; U) which is sufficiently accurately approximated by the geometrical mean value $$\sqrt{s(l;\ U) \cdot s(k;\ U)}\ .$$

It follows therefrom that:

$$q(l - k) = \frac{1}{s(l;\ U) \cdot s(k;\ U) \cdot 4} \cdot \text{Ramp}\,(l - k) \quad (1\text{-}6)$$

Furthermore, r(k) (formula 1-3) is the distance between the central point 9 and the ray k. When the distance between the point source 1 and the central point is assumed to be D, $r(k)=D \cdot \sin \sigma(k)$ (1-7). When the formulae (1-6) and (1-7) are inserted in (1-3), it follows that:

$$\hat{p}(l) = \sum_k ((4 \cdot s(l;\ U) \cdot s(k;\ U))^{-1} \cdot \text{Ramp}\,(l - k) \cdot$$

$$p(k) \cdot \frac{d(D \sin \sigma\,(k))}{d\,k}$$

By using the formula (1-5), it follows that:

$$\hat{p}(l) = \frac{D}{4\,u^2} \cdot \sum_k \left( \frac{d\sigma(l)}{d\,l} \cdot \frac{d\sigma(k)}{d\,k} \right)^{-1} \cdot \text{Ramp}\,(l - k) \cdot p(k) \cdot \quad (1\text{-}8)$$

$$\cos \sigma\,(k) \cdot \frac{d\sigma(k)}{d\,k}$$

$$\hat{p}(l) = \frac{D}{4\,U^2} \cdot \left( \frac{d\sigma(l)}{d\,l} \right)^{-1} \cdot \sum_k$$

Ramp $(l - k) \cdot p(k) \cdot \cos \sigma\,(k)$

Or $$\hat{p}(l) = \frac{D}{4\,U^2} \cdot \left( \frac{d\sigma(l)}{d\,l} \right)^{-1} \cdot g(l)$$

where $$g(l) = \sum_k \text{Ramp}\,(l - k) \cdot p(k) \cdot \cos \sigma\,(k)$$

Formula (1-8) is a convolution calculation which can be generally used in any computer tomography device suitable for the processing of groups of measured data which have been measured along groups of diverging measuring paths. After the weighting of each measured data p(k) with the cosine of the angle $\sigma(k)$ enclosed by an associated measuring path k and the central ray 8, the measuring measured data thus pre-conditioned are convoluted with the standardized, dimensionless convolution factor series (defined between [.] in the formula (1-4), after which the convoluted measured data should be multiplied by a post-conditioning factor $(d\sigma(l)/(dl)^{-1}$ and, upon back-projection of a measured data p(l) thus treated, the value to be assigned to a point should be weighted again by $D \cdot (4 \cdot U^2)^{-1}$, for which back projection should take place at a distance r(l) from the centre 9 along the measuring path l which enclosed an angle $\sigma(l)$ with respect to the central ray 8 and along which the value p(l) has been measured.

The above general formulae will be elaborated hereinafter for the various types of computer tomography scanners.

When the measured values p(k) are measured along measuring paths k where two arbitrary neighbouring measuring paths k and k+1 each time enclose an equally large apex $\Delta\alpha$ (equiangular distribution of the measuring paths k), the value $d\sigma(l)/dl$ is constant and equal to $\Delta\alpha$. The angle $\sigma(k)$ then equals $(k-\frac{1}{2}) \cdot \Delta\alpha$. Formule (1-8) then becomes:

$$\hat{p}(l) = \frac{D}{4 \cdot U^2 \cdot \Delta\alpha} \cdot g(l) \qquad (1-9)$$

It is clearly shown that the post-conditioning factor $\Delta\alpha^{-1}$ has thus become independent of the variable l, so that the multiplication by $\Delta\alpha^{-1}$ need not be separately performed but can simply be taken into account for the back-projection as a constant during a preceding calculation (for example, prior to the execution of or during the convolution calculations) or during a subsequent calculation.

It can simply be established that, if the central ray 8 were situated asymmetrically between the measuring paths 1 and −1, for example, $\Delta\alpha/4$ between the measuring path 1 and the central ray 8, the formula (1-9) would undergo only a small modification: only the preconditioning factor $(\cos(k-\frac{1}{2})\Delta\alpha)$ would change and in the present example the preconditioning factor would be $(\cos(k-\frac{3}{4})\cdot\Delta\alpha)$. Such a measuring arrangement is sometimes used for enhancement of the resolution in the reconstructed image.

A typical non-equiangular distribution of the measuring paths as shown in FIG. 3 implies the following derivation for the necessary pre-conditioning and post-conditioning factors: The measured values p(k) are measured by means of detectors which are arranged in a straight line and which measure all radiation along a measuring path which has a width a on a line C which is situated at a distance D from the focus F of the radiation source. Again:

$$\hat{p}(l) = \sum_k q(l-k) \cdot p(k) \cdot \frac{d\,r(k)}{d\,k} \qquad (1-3)$$

and $$q(l-k) = R_N^2 \cdot (l-k) \qquad (1-4)$$

wherein $$R_N^2 = (4 \cdot s(l; U) \cdot s(k; U))^{-1}$$

It can be deduced from FIG. 3 that:

$$tg\,\sigma(i) = (i-\tfrac{1}{2}) \cdot a \cdot D^{-1}$$

$$\cos\sigma(i) = [1 + ((i-\tfrac{1}{2})\,a \cdot D^{-1})^2]^{-\frac{1}{2}}$$

so $\sigma(i) = \arctan((i-\tfrac{1}{2}) \cdot a \cdot D^{-1})$
Furthermore:

$$r(k) = D \cdot \sin(\sigma(k)) \text{ and}$$

$$s(i; U) = U \cdot \frac{d\sigma(i)}{d\,i},$$

where U is the distance between an arbitrary point t on a measuring path i and the focal point F.

Using the foregoing it can be demonstrated that from (1-4) and (1-3) and via $$\hat{p}(l) = D^2 \cdot (4 \cdot U^2 \cdot d\sigma(l)/dl)^{-1} \cdot g(l) \qquad (1-8)$$

where $$g(l) = \sum_k \text{Ramp}\,(l-k) \cdot p(k) \cdot \cos\sigma(k)$$

it follows that:

$$\hat{p}(l) = \frac{D^2}{4 \cdot a \cdot U^2} (1 + ((l-\tfrac{1}{2})a/D)^2 \cdot \sum_k (1+((k-\tfrac{1}{2})a/D)^2)^{-\frac{1}{2}} \cdot \qquad (1-10)$$

$$p(k) \cdot \text{Ramp}\,(l-k)$$

Consequently, also when a non-angular distribution of measuring paths formed by a straight row of equally wide detectors is used, the same convolution filter can be used as in a computer tomography apparatus supplying measured values which have been determined along parallel equidistant measuring paths. The arrangement shown in FIG. 3 also necessitates a multiplication by a pre-conditioning factor $((1+((k-\tfrac{1}{2})\cdot a/D)^2)^{-\frac{1}{2}})$ and, after convolution, by a post-conditioning factor $(1+((l-\tfrac{1}{2})\cdot a\cdot/D)^2)$ in order to enable the use of the same (parallel) convolution filter.

FIG. 4 shows a measuring arrangement for determining measured data p(k) in a so-called fourth generation computer tomography apparatus, utilizing an array of detectors with a ring of equiangularly arranged detectors. In FIG. 4 the detectors are arranged to be stationary at a distance R1 from the centre of rotation 9. The point source (focus of X-ray tube) rotates at a distance R2 about the center 9, a group of measured values thus being determined for a series of successive positions of the point source along measuring paths n, . . . 1, 0, −1, . . . −n by means of a single detector 5. (Each of the neighbouring detectors 5′ and 5″ also supplies a group of measured data).

Evidently, it is also possible to make the X-ray source (point source 1, FIG. 1) travel along the circle having the radius $R_1$ and to arrange the detectors on the circle having the radius $R_2$. Such a reversal has no effect on the validity of the below derivation for the pre-conditioning factors, the use of the (parallel) convolution filter, and the post-conditioning factors (be it that $R_1$ and $R_2$ must also be interchanged in the following formulae).

The following general formula is used:

$$\hat{p}(l) = \frac{D}{4\,U^2} \cdot (d\sigma(l)/dl)^{-1} \cdot g(l) \qquad (1-8)$$

where $$g(l) = \sum_k \text{Ramp}(l - k) \cdot p(k) \cdot \cos \sigma(k)$$

For the situation shown in FIG. 4:

$$\tan(\sigma i) = R_2 \cdot \sin(i \cdot \Delta \alpha) \cdot (R_1 + R_2 \cdot \cos(i \cdot \Delta \alpha))^{-1}$$

wherefrom it can be deduced that:

$$(d\sigma(l)/dl)^{-1} = \frac{R_1^2 + R_2^2 + 2R_1 \cdot R_2 \cdot \cos(1 \cdot \Delta \alpha)}{(R_2^2 + R_1 \cdot R_2 \cdot \cos(l \cdot \Delta \alpha))} \quad (1\text{-}11)$$

and $$\cos(\sigma(k)) = \frac{R_1 + R_2 \cdot \cos(k \cdot \Delta \alpha)}{(R_1^2 + R_2^2 + 2 \cdot R_1 \cdot R_2 \cdot \cos(k \cdot \Delta \alpha))^{\frac{1}{2}}} \quad (1\text{-}12)$$

Both formulae (1-11) and (1-12) can be rewritten (where $R_1/R_2 = v$) as:

$$Q(l) = (d\sigma i/dl)^{-1} = \frac{v^2 + 1 + 2v\cos(l \cdot \Delta \alpha)}{(1 + v \cdot \cos(l \cdot \Delta \alpha))} \quad (1\text{-}11')$$

$$Q(k) = \cos\sigma(k) = \frac{v + \cos(k \cdot \Delta \alpha)}{v^2 + 1 + 2v \cdot \cos(k \cdot \Delta \alpha)} \quad (1\text{-}12')$$

After insertion of (1-11') and (1-12'), the general formula (1-8) becomes $$p(l) = \frac{R_1}{4U^2 \cdot \Delta \alpha} \cdot \frac{v^2 + 1 + 2v \cdot \cos(l \cdot \Delta \alpha)}{1 + v \cdot \cos(l \cdot \Delta \alpha)} \cdot g(l) \quad (1\text{-}13)$$

wherein $$g(l) = \sum_k \text{Ramp}(l - k) \cdot p(k) \cdot \frac{v + \cos(k \cdot \Delta \alpha)}{v^2 + 1 + 2v \cdot \cos(k \Delta \alpha)}$$

It will be clear that thanks to the use of the convolution calculation in accordance with the formula (1.13) (non-equiangular distribution of measuring paths) it is not necessary to form an equiangular distribution of the measuring paths by interpolations which would otherwise be required for the convolution calculations according to the present state of the art.

It is to be noted that the angle $\Delta \alpha$ used in the formula (1-13) is enclosed by lines passing through the centre of rotation 9 from two successive source positions (l, m); this is contrary to the angle $\Delta \alpha$ in the formula (1-9) which is enclosed by two neighbouring measuring paths which extend from a source position $\theta$ to two neighbouring detectors 5.

The above derivations of convolution formulae have been performed for situations in which the measured values p(k) are determined along a group of measuring paths in a diverging beam of radiation. However, in a substantial number of computer tomography apparatus the measured values are presented in groups determined along parallel measuring paths by resorting on the basis of sets of diverging groups of measuring paths. Using the formulas (1-3) and (1-4):

$$\hat{p}(l) = \sum_k R_N^2 \cdot \text{Ramp}(l - k) \cdot p(k) \cdot dr(k)/dk \quad (1\text{-}4')$$

where $R_N$ equals $(2.s)^{-1}$ and s represents the mean length of arc through a given point between two measuring paths. In the case of parallel measuring paths, therefore, s is the mean distance between the measuring paths. The variable $R_N^2$ can be rewritten as:

$$R_N^2 = \left[ 4 \cdot \left( \frac{dr(H)}{dH} \right)_{H=k} \cdot \left( \frac{dr(H)}{dH} \right)_{H=l} \right]^{-1}$$

After insertion of $R_N^2$ in (1-4') it follows that:

$$\hat{p}(l) = \frac{(dr(l)/dl)^{-1}}{4} \cdot \sum_k \text{Ramp}(l - k) \cdot p(k) \quad (1\text{-}14)$$

It will be clear that a weighting operation (multiplication by a post-conditioning factor $((dr(l)/dl)^{-1})$ is required only after convolution. The preconditioning factor ($\cos(\sigma(k))$, see formule (1-8)) found thus far now equals 1, because the measuring paths now extend in parallel (the angle $\sigma(k) = 0$). The post-conditioning factor depends on the distance between the successive measuring paths. When the group of parallel measuring paths is obtained by the restoring on the basis of sets of diverging measuring paths (which are equiangularly distributed), the distance between the measuring path and a central measuring path $r(l) = D.\sin(l-\frac{1}{2}) \cdot \Delta \alpha$, in which D represents the distance between the source 1 and the centre of rotation 9, l represents the index number of the measuring path for which a convoluted measured value is determined, and $\Delta \alpha$ represents the angle enclosed by two neighbouring measuring paths in the diverging beam. Taking into account a distance function thus described, the convolution function in this situation will be:

$$\hat{p}(l) = \frac{1}{4 \cdot \Delta \alpha \cdot D} \cdot (\cos(1 - \tfrac{1}{2}) \cdot \Delta \alpha)^{-1} \sum_k \text{Ramp}(l - k) \cdot p(k) \quad (1\text{-}15)$$

It is to be noted that for the back-projection of the convoluted measured values the distance between the measuring paths which are not equidistant must be taken into account.

It will be clear that the use of a convolution calculation according to the formula (1-14) (non-equidistant parallel distribution of the measuring paths) makes it unnecessary to perform interpolations in order to obtain an equidistant distribution of measuring paths which would otherwise be necessary according to the present state of the art.

When the measured values p(k) have been determined along parallel measuring paths which are equidistant, formula (1-14) becomes the known formula:

$$\hat{p}(l) = \frac{1}{4a} \cdot \sum_k \text{Ramp}(l - k) \cdot p(k) \quad (1\text{-}16)$$

This formule (1-16) is known, for example, from Proc. Nat. Acad. Science, USA, Vol. 6S, No. 9, pages 2236-2240, September 1971, in which it is derived in a completely different manner.

In the foregoing the formulae (1-8), (1-10), (1-13) and (1-14) have been derived for convolution calculations on measured data determined along non-equiangularly or non-equidistantly (parallel) distributed measuring paths. Such formulae also enable convolution calculations and back-projection calculations to be performed in the following cases in which the processing of measured data would stall according to the present state of the art:

I. When the number of measured data associated with a group (for example, 576 measured data) is larger than the maximum number of data in group which can be processed by the filtering device 16a and/or the back-projection devices 16b (for example 512 or 256). In accordance with the present state of the art, a new group of 512 or 256 measured data should then be calculated by means of interpolations from the 576 measured data, said new group being associated with equiangularly distributed (or equidistantly parallel distributed) fictitious (wider) measuring paths. The resolution to be reached is thus restricted. In accordance with the invention, a suitable group of (512 or 256) measured data can be found from the (excessively large) group of (576) measured data without deterioration of the resolution, for example, in the centre of the image to be reconstructed. The measured data situated in the center of the suitable new group correspond to those of the excessively large group. Between the measured data situated in the center of the new group and the measured data situated at the outer "edges" of the new group, the "width" of the successive measured data increases according to a function which can be differentiated (for example, a $\cos^2$ function). A numerical example: assume that the excessively large group comprises 576 measured data; the new group comprises only 512 measured data and the resolution within the center, being determined by 400 measured data, may not be affected. The remaining (576−400) measured data of the excessively large group must then be distributed among (512−400) measured data of the new group so that a differentiable, increasing function (because $d(\sigma(l)/dl$ must exist) arises which extends from the edge of the center to a maximum which need not necessarily coincide with the edge of the new group.

Such a transition can be effectively used wherever measure data with a high resolution result and measure data deliberately measured with a low resolution are measured (wide detector elements at the edge of the detector array 4).

II. When the number of a group of measured data is incomplete. Notably when measured data are lacking at one side of the group, for example, because an arm of the patient is situated outside the X-ray beam (in the case of different positions of the X-ray source), the group of measured data should be complemented so that the measured data can be processed without giving rise to errors. Assuming that the total sum of all measured data should be (substantially) equal for each source position, a lacking measured data is to be determined for each incomplete group of measured data (the total sum minus the sum of the measured data of the incomplete group); this measured data would have been measured along a fictitious wide measuring path with a large detector (when the measured data are incomplete at both sides of a group, it is necessary to distribute the difference between the total sum and the sum of the incomplete group between both sides while taking into account the actual circumstances; how is the patient positioned with respect to the central ray 8 of the X-ray beam). From the group of the measured data a transition should be made to increasingly wider measured data (in accordance with the differentiable function) so that they connect with the fictitious wide measured data generated. Obviously, the realization of such a transition will be at the expense of the part of the measured data which adjoin the "wide" measured data and which have been measured with a much higher resolution by means of the detectors 5.

After convolution and possibly multiplication by a post-conditioning factor, the measured data thus treated must be back-projected in an image storage matrix by the back projection devices 16b. The ultimate attenuation value f(x, y) resulting in a point p(x, y) can be written as:

$$f(x, y) = c \sum_{\theta} U^{-2} \cdot G(l, \theta) \tag{2-1}$$

where c: is a constant in which inter alia the distance between the center of rotation 9 and the X-ray source 1 is taken into account, U: is the distance between the X-ray source 1 and the point x, y, and $G(l, \theta) = g(l, \theta) \cdot d\sigma(l, \theta)/dl$, see formula (1-8).

Figure 5:
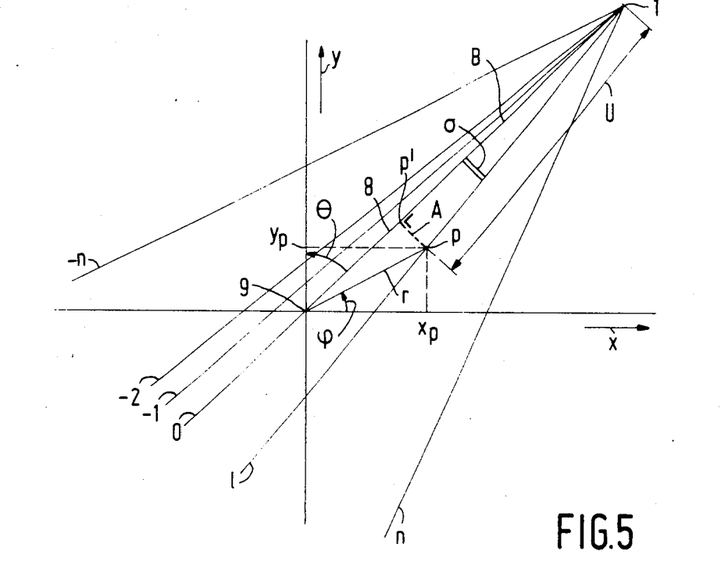

This is shown in FIG. 5 for the sake of clarity. In formula (2-1) the variable U as well as the variable l is dependent on the point p(x, y) to be selected. In order to enable a comparatively simple implementation of the back-projection device 16b, formula (2-1) is transformed as follows:

$$f(x, y) = C \sum_{\theta} \cdot \frac{\cos^2 \sigma_l}{B^2} \cdot G(\sigma_l, \theta) \tag{2-2}$$

in which $B = U \cdot \cos \sigma = D + r \sin (\theta - \phi)$. The index l in formula (2-1) is now expressed in the angle $\sigma_l$, because a given angle $\sigma$ is associated with a given value of l. Formula (2-2) can be further simplified:

$$f(x, y) = C \sum_{\theta} \frac{1}{B^2} \cdot H(\sigma_l, \theta) \tag{2-3}$$

in which $$H(\sigma_l, \theta) = \cos^2(\sigma_l) \cdot G(\sigma_l, \theta) \tag{2-4}$$
$$= \cos^2(\sigma_l) \cdot (d\sigma_{(l)}/dl)^{-1} \cdot g(\sigma_{(l)} \cdot \theta)$$

It follows from the formula (2-4) that a convoluted measured value g(l) associated with an angle $\sigma_l$ in the beam of diverging X-rays is to be multiplied by the factor $(d\sigma_l/dl)^{-1}$ as well as by $\cos^2 \sigma_l$, after which the actual back-projection is performed in the back-projection device 16b. During the back-projection, a weighting operation is performed which is inversely proportional to the distance B between the source point 1 and the projection point p′ of the point p(x, y) on the line 1-9.

Figure 6:
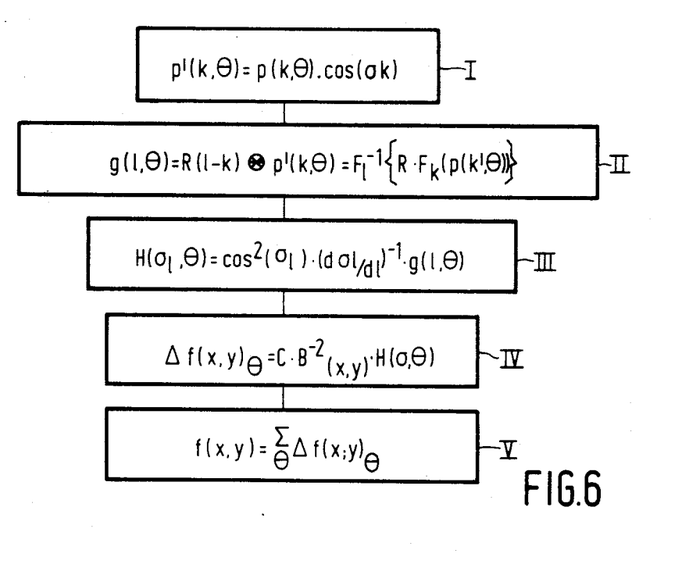
FIG. 6 shows a flow chart of the processing of measured data in order to form a reconstructed image.

For the reconstruction of an image of an irradiated object 7 can be subdivided the steps as shown in a general diagram in FIG. 6 can be distinguished. Each measured data of the group of measured data p(k, $\theta$) is multiplied during a first step I by an associated preconditioning factor cos ($\sigma_k$). During the second step II, the measured data p′(k, $\theta$) of a group thus preconditioned are convoluted or filtered as if the measured data had been measured along parallel measuring paths (in FIG. 6, this is denoted by $$g(l, \theta) = R(l - k)p'(k, \theta) = F_l^{-1}\{R \cdot F_k\{p'(k, \theta)\}\}$$

in which $F_k\{.\}$ means a Fourier transformation to k and $F_l^{-1}\{.\}$ means a Fourier back-transformation to l. During the third step III, the measured data thus convoluted are multiplied by a post-conditioning factor which is proportional to $(d\sigma_l/dl)^{-1}$ and to $\cos^2 \sigma_l$. During the fourth step IV, a back-projection data thus obtained for all points (x, y) situated on the projection or measuring path l are weighted by $B^{-2}(x, y)$, after which during a fifth and final step the weighted back-projection value $\Delta f(x, y)$ is added to the back-projection value f(x, y) calculated thus far for a point (x, y). Because all steps I through V are actually mutually independent, the calculations of step i (i=I, II, III or IV) for a next group of measured data may commence as soon as the results of the preceding group of measured data have been "taken over" by the step i+1. In the filtering device 16a and the back-projection device 16b (see FIG. 1b), therefore, a so-called pipe-line processing technique can be advantageously used.

Figure 7:
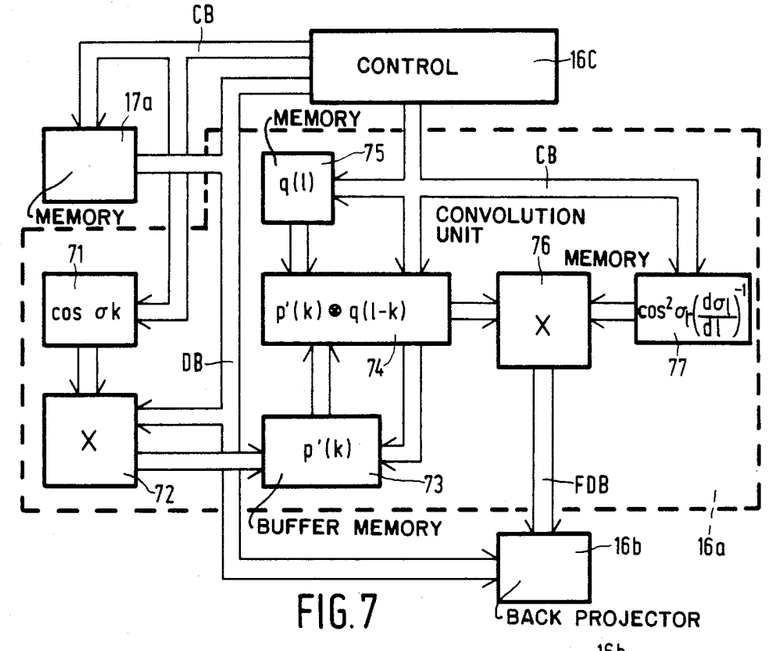
FIG. 7 shows a block diagram of a filtering device in accordance with the invention.

FIG. 7 shows a block diagram of an embodiment of a filtering device 16a. The measured data determined by means of the source 1 and the detectors 5 shown in FIG. 1a are stored in a given section 17a of the memory 17, the sequence of the measured data being determined by the position k of the detector 5 in the detector array 4, the measured data thus also being determined. The measured data stored in the memory section 17a are fetched by way of an address k which is formed by an address generator in the control unit 16c. In its simplest form the address generator comprises a pulse generator and a counter which is connected thereto and whose content forms an address. A generated address k is also presented to a memory 71 in which the weighting factors (preconditioning factors) $\cos \sigma_k$ are stored. The measured data p(k) as well as the weighting factor $\cos \sigma_k$ is applied to a multiplier 72, so that the pre-conditioned measured data p'(k) is generated on the output thereof. The measured data p'(k) thus obtained are stored in a buffer memory 73 which may consist of a further part of the memory 17 (FIG. 1b). The measured data p'(k) are fetched by a convolution unit 74, and so are a row of convolution factors q(l) which are stored in a memory 75. The convolution unit 74 calculates a group of convoluted measured data $g(\sigma_l)$ in known manner from each pre-conditioned group of measured data p'(k). The filtered value $g(\sigma_l)$ is applied to a multiplier 76, a second input of which receives a post-conditioning factor $\cos^2 \sigma(l) \cdot (d\sigma_l/dl)^{-1}$. The post-conditioning factors are stored in a post-conditioning factor memory 77 which is preferably formed by a programmable memory (like the memory 71), so that the pre-conditioning and post-conditioning factors can be adapted to the geometry of the source 1 and the detector array 4 (notably also when one or more detector elements 5 were to become defective). The result of the multiplier 76 is applied to the back-projection device 16b. The back-projection device 16b also receives, in the form of a few constant values, the orientation of the source 1 with respect to the x-y coordinate system, so that the back-projection device 16b always receives a group of measured data to be back-projected plus the associated constant value concerning the geometrical orientation with respect to the point of rotation 9 (x=y=0). Instead of using a convolution unit 74, the filtered value $g(\sigma_l)$ can also be calculated in known manner by way of Fourier transformation, filtering and back-transformation utilizing for example, the Ramp filter or Shepp filter.

Figure 8:
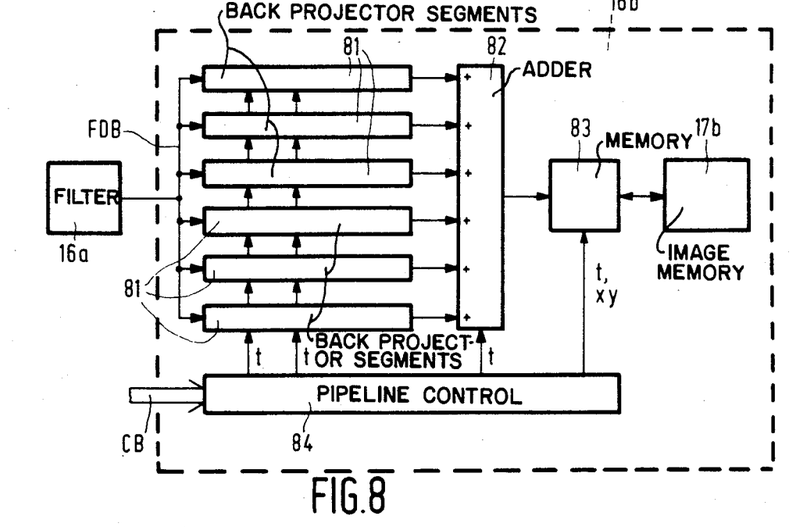
FIG. 8 shows a back-projection device in accordance with the invention.

FIG. 8 is a more detailed representation of a back-projection device 16b in accordance with the invention. The back-projection device 16b comprises several (16) parallel operating back-projection segments 81, an adder 82, a memory control circuit 83, an image memory 17b and a pipeline control circuit 84. From the filtering device 16a, each segment 81 receives, via the bus FDB, a profile $H(\sigma, \theta_j)$ to be back-projected and the associated geometrical constant values and stores this set of information in a first part of profile memories (94, see FIG. 9). The constant values stored with a profile $H(\sigma, \theta_j)$ will be explained hereinafter. Via a control circuit 84, control and counting pulses t are presented to each segment 81. In each segment 81 a radiation attenuation contribution $\Delta f(x, y)$ is calculated for one given image element having the coordinates x, y. All contributions $\Delta_j f(x, y)$ calculated by the segments $81_j$ are added by the adder 82, the sum of the various contributions being added as a unit to the previously calculated sums at the memory location (x, y) of the image memory 17b. The foregoing operation is performed by the memory control circuit 83 which receives a control pulse t and the associated address (x-y) of the image memory 17b at the correct instant via the pipeline circuit. When a sum of the contributions from each profile $H(\sigma_l, \theta)$ has been calculated for each address (x, y), in each segment 81 a change-over is made to a second section of the profile memories (94, FIG. 9). During the back-projection of a profile $H(\sigma_l, \theta_j)$ stored in the first section, a second profile is stored in said second section. Thus, after the changing over, contributions will be calculated again (starting with $x_o, y_o$) for each pixel x-y on the basis of the second profile stored in the second section of the profile memory 94, a new profile then being loaded into the first section of the profile memory 94. The operation of the profile memory 94 and the control circuit 84 will be described in detail hereinafter.

It is to be noted that, because of the segmenting 81 of the back-projection 16b, an advantage is obtained in that, should a segment 81 operate incorrectly or break down completely, reconstructions can still be performed by deactivation of the faulty segment 81 and adaptation of the adder 82. Obviously, reconstruction will then be slower.

Figure 9A:
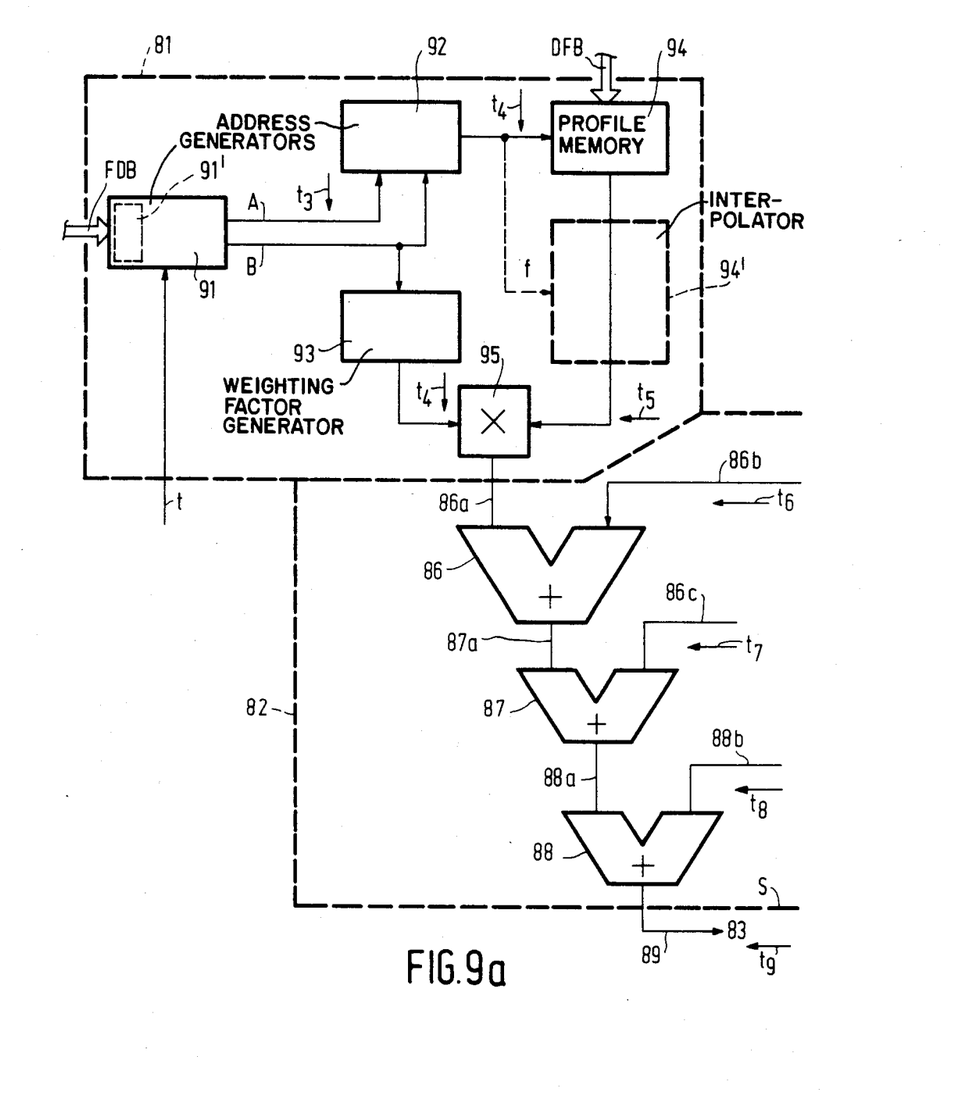
FIGS. 9a and 9b are more detailed representations of the back-projection device of FIG. 8.

FIG. 9a shows a block diagram of a back-projection segment 81 and a part of the adder 82 in accordance with the invention. The back-projection segment 81 comprises in principle an address generator 91, a profile address generator 92, a weighting factor generator 93, a profile memory 94 and a multiplier 95 whose output is connected to an adder 86 which forms part of the adder 82 of FIG. 8. The address generator 91 receives (from the control circuit 84) counting pulses t and, in response to each counting pulse, it generates two new numerical values A and B which are a measure for the position of the pixel P having the coordinates x-y as shown in FIG. 5. In order to determine the values A and B for each pixel P, some constant geometrical values are added to each profile, said constant values being determined by the source position 1 with respect to the origin 9 associated with the profile to be processed. This will be described in detail hereinafter. For this pixel P a contribution is then calculated. The two numerical values A and B serve to locate the back-projection values H($\sigma$, $\theta$) and to determine the weighting factor C.B$^{-2}$. The numerical value B can be used as an address for the searching of the weighting factor C.B$^{-2}$ in a weighting factor memory. Instead of the storage of all weighting factors C B$^{-2}$ which are addressed by the factor B, use can also be made of a memory in which the values 1/B are stored. These values 1/B are then addressed by the address B and are multiplied by one another in order to form the distance factor 1/B$^2$. Thus, by using a single multiplier an entire memory is saved. The value 1/B per se is also required, as will be demonstrated hereinafter. The numerical values A and B are both applied to the profile address generator 92 which generates an address as a function of the value A/B for the searching of the back-projection value H($\sigma$, $\theta$). When the measuring paths are equiangularly distributed, the profile address generator 92 may be a memory in which there is stored an arc tan table ($\sigma$=arctan A/B) which is addressed by the values A and B. The profile address generator 92 may also comprise a memory and a multiplier, the memory being addressed by the value B in order to find the value 1/B which is applied to the multiplier, like the value A, so that the output of the multiplier supplies an address A/B. When non-equidistantly or non-equiangularly determined groups of measured data are to be back-projected, it is useful to add to the profile address generator 92 an additional freely programmable memory which is addressed by the address A/B. The additional memory enables a desirable address translation of the address A/B to the non-equidistant position of the measured data within the group to be back-projected. The addressed back-projection value H($\sigma$, $\theta$) is also applied, like the weighting factor C.B$^{-2}$ to the multiplier 95 whose output is connected to an input 86$a$ of the adder 86 which forms part of the adder 82 of FIG. 8. The output of a multiplier of a further segment 81 is connected to the second input 86$b$ of the adder 86. The sum of the two contributions applied to the adder 86 is applied to the adder 87 where it is incremented by the contribution calculated by a third segment 81. The sum thus formed is applied to an input 88$a$ of a third adder 88. A sum of the contributions of three further segments, formed via two adders (not shown), is applied to a second input of the adder 88. The output 89 of the adder 88 is connected to the memory control circuit 83.

Figure 9B:
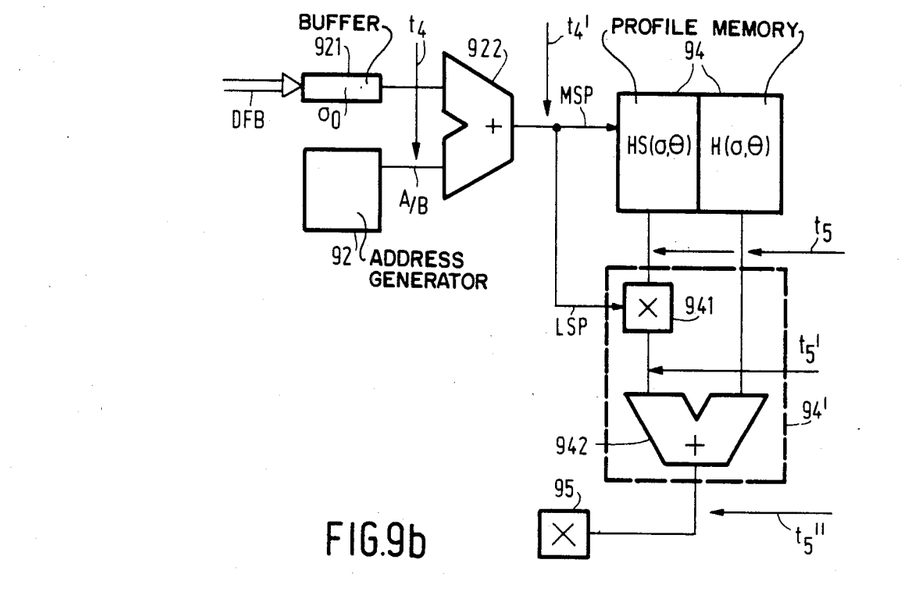

The accuracy of the calculations performed by the segments 81 can be increased, if necesssary, by means of the following steps which will be described with reference to FIG. 9$b$. For each value H($\sigma_l$, $\theta$) an increment HS($\sigma_l$, $\theta$) is determined which is equal to the difference between two adjacent values H($\sigma_l$, $\theta$) and H($\sigma_{l+1}$, $\theta$). This increment HS($\sigma_l$, $\theta$) is fetched simultaneously with the address A/B generated by the profile address generator 92 (actually, the memory 94 then consists of two parallel driven memories). Both values H($\sigma_l$, $\theta$) and HS($\sigma_l$, $\theta$) are applied to an interpolator 94' (see FIG. 9$b$). The interpolator 94' operates as follows: the address A/B generated by the address generator 92 is larger than the value $\sigma_l$ and smaller than $\sigma_{l+1}$. This means that the most significant part MSP of the address A/B is equal to $\sigma_l$ and that the least significant part LSP (the part "behind the decimal point") is a measure for the position of the address A/B among the addresses $\sigma_l$ and $\sigma_{l+1}$. The least significant part LSP is applied to a multiplier 941 and so is the increment HS($\sigma_l$, $\theta$) (addressed by MSP(A/B)). The product of the values presented to the multiplier 941 (LSP and HS($\sigma_l$, $\theta$) is added to the profile values H($\sigma_l$, $\theta$) via an adder 942, after which the sum is presented to the multiplier 95 for further processing.

A further step to increase the accuracy is the adaptation of the profile address arctan A/B which is generated by the profile address generator 92. The values A and B generated by the address generator 91 are exact only if the positions actually occupied by the X-ray source and the detectors 5 correspond to the theoretical positions which can be generated from the geometrical constant values. A deviation $\sigma_o$ of the source position 1 from the theoretical value can be measured and be added to the geometrical values associated with the relevant profile as a correction value. The deviation $\sigma_o$ thus determined is then added to the theoretical address (determined by (arctan A/B)) by means of an adder 922 which is connected between the profile address generator 92 and the profile memory 94. With each profile H($\sigma_l$, $\theta$) there is thus associated a constant correction value which is stored in a buffer 921 via the bus DFB as soon as a new profile is stored in the profile memory 94.

Figure 10:
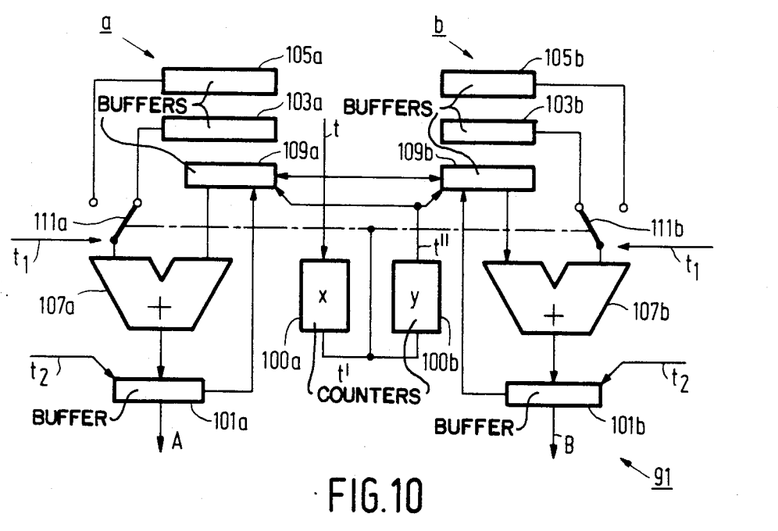
FIG. 10 is a detailed representation of an address generator for the back-projection device shown in FIG. 8.
Figure 11:
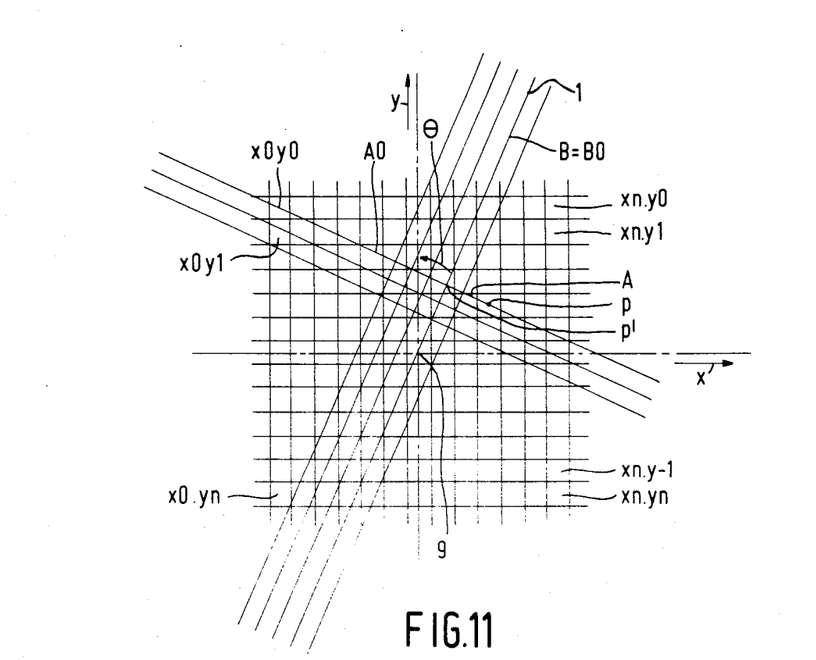
FIG. 11 illustrates the operation of the address generator shown in FIG. 10.

The address generator 91 of FIG. 9$a$ is shown in greater detail in FIG. 10. The address generator 91 comprises two counters 100$a$ and 100$b$; the x-counter 100$a$ receives counting pulses t. The maximum number n to be counted by the counters 100$a$ (and 100$b$) equals the number of elements $x_o$, ... $x_n$ in a row or the number of elements $y_o$, ... $y_n$, respectively, in a column of the image matrix in the memory 17$b$. This image matrix is diagrammatically shown in FIG. 11 with the elements $x_o$, $y_o$, ... $x_n$, $y_n$; $x_o$, $y_1$, ... $x_n$, $y_n$. FIG. 11 also shows the source position 1 after rotation through an angle $\theta$ about a point 9 which is situated in the origin (0, 0) of the x-y system of coordinates. It can deduced that for the point 9 in $x_i$, $y_i$ the distance A between p and p' (the projection point of p on the central ray 8) can be expressed in $x_i$·cos $\theta$+$y_i$·sin $\theta$ and that the distance B between 1 and p' can be expressed in $x_i$·sin $\theta$+$y_i$·cos $\theta$+D, D being the distance between the source 1 and the origin 9. It is to be noted that a constant value of B is associated with each position on the line p—p'.

The counter 100$a$ (FIG. 10) receives control pulses t (see FIG. 8) and counts down all x-positions, starting from the position $x_o$ (up to and including $x_n$); the count of the counter 100$b$ (position y) then remains the same. After the final position $x_n$ has been reached, the counter 100$a$ returns to its starting position $x_o$, thus supplying a control pulse t' to the counter 100$b$ which is incremented by one position ($y_i \rightarrow y_{i+1}$). After this operation has been repeated n times, the counter 100$a$ and the counter 100$b$ will have returned to their starting position and all addresses of the memory matrix 17$b$ will have been addressed.

In addition to the two counters 100$a$ and 100$b$, the address generator 91 comprises two parallel operating counting segments a and b which generates the values A and B, respectively, in cooperation with the counters 100$a$ and 100$b$. Each counting segment a and b comprises four buffers 101$a$, 101$b$; 103$a$, 103$b$; 105$a$, 105$b$; 109$a$, 109$b$; an adder 107$a$, 107$b$, and a switch 111$a$, 111$b$. In the buffers 101$a$, 101$b$; 103$a$, 103$b$ and 105$a$, 105$b$ the constant geometrical numerical values are stored which are associated with a profile H($\sigma_l$, $\theta$) to be back-projected. The numerical values are loaded into the buffers 101$a$, 101$b$, through 105$a$, 105$b$ during the loading of a profile H($\sigma$, $\theta$) into a section of the profile memory 94. These buffers are denoted by the reference numeral 91' in FIG. 9 and receive their constant numerical values via the bus DFB. A first constant geometrical numerical value is referred to as $A_o$, $B_o$ and is stored in the buffer 101a, 101b. The numerical values $A_o$ and $B_o$ represent the distances A and B, respectively, which are associated with the element $x_o$, $y_o$ for which the first back projection value is calculated. In the buffers 103a, 103b there are stored the values A1 and B1 which are used to form numerical values A' and B' from the numerical values $A_o$ and $B_o$ associated with the element $x_o$, $y_o$, the numerical values A' and B' being associated with the element $x_1$, $y_o$. As has already been described, $$A' = A_o + x_1 \cdot \cos\theta = A_o + \cos\theta, \text{ and}$$

$$B' = B_o + x_1 \cdot \cos\theta = B_o + \sin\theta.$$

Thus, the buffers 103a, 103b store a value proportional to $\cos\theta$, $\sin\theta$, respectively. After a first counting pulse t, the numerical values $A_o$, $B_o$ will be taken over in the buffers 109a, 109b and will also appear on the address outputs A and B of the address generator 91. After a second pulse t, the adder 107a and 107b will add the content of the buffers 103a and 109a and the content of the buffers 103a and 109b, respectively, so that on the output of the adder 107a and 107b the numerical values A' and B' appear which are associated with the element $x_1$, $y_o$. After each subsequent control pulse t, the numerical value A', B' will increase by the value $\cos\theta$, $\sin\theta$, respectively, thus forming the A and B values associated with the elements $x_i$, $y_o$; $x_{i+1}$, $y_o$ etc., until the values A and B associated with the element $x_n$, $y_o$ have been calculated. The x-counter 100a then supplies a pulse t' which switches over the switches 11a and 11b and connects the buffers 105a and 105b to the adders 107a and 107b, respectively, until a next pulse t. In the buffers 105a and 105b the two geometrical numerical values A2 and B2 are stored which, when added to the numerical values $A(x_n, y_o)$, $B(x_n, y_o)$ associated with the element $(x_n, y_o)$, produce the numerical values $A(x_o, y_1)$, $B(x_o, y_1)$. It can now be deduced from FIG. 11 that $A_2 = x_n \cdot \cos\theta + \sin\theta$ and that $B_2 = x_n \cdot \sin\theta + \cos\theta$.

After a next control pulse t, the switches 111a and b will again occupy the position shown. The numerical values A and B then present in the buffers 101a and b are associated with the element $(x_o, y_1)$. A next series of pulses t will produce the values associated with the elements $(x_i, y_1)$ until $x_n$ is reached and another pulse t' is generated, etc. After a pulse t' has been generated n times (which means that for the last element $x_n$, $y_n$ the A and B numerical values have been calculated), the counter 100b supplies a pulse t'' which erases the buffers 109a and 109b. The buffers 10a, 10b, 103a, 103b and 105a, 105b are then loaded with new geometrical numerical values $A_o$, $B_o$, $A_1$, $B_1$, $A_2$ and $B_2$ which are associated with a new profile $H(\sigma_l, \theta)$ to be back-projected. Evidently, the numerical values $A_o$, $B_o$, $A_1$, $B_1$, $A_2$ and $B_2$ differ for each profile $H(\sigma, \theta)$ and change as soon as the distance between the source 1 and the rotation point 9 is changed. The numerical values $A_o$, $B_o$ etc. can be simply calculated by the control unit 16c for each profile $H(\sigma, \theta)$ from the signals supplied by the sensor 20 concerning the rotation of the frame 10 and from the signals caused by the manipulation of the pushbutton 27 (see FIG. 1a).

Figure 12:
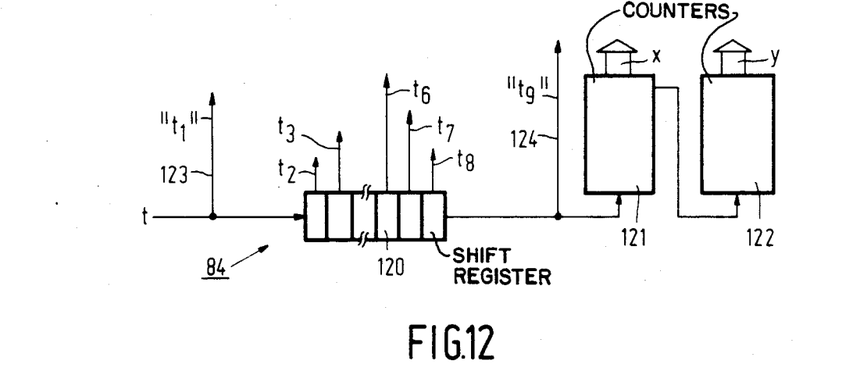
FIG. 12 shows a part of the conical circuit for the back-projection device shown in FIG. 8.

FIG. 12 diagrammatically shows the simplest form of a pipeline control circuit 84. The circuit 84 comprises only one shift register 120 and two counters 121 and 122. The circuit 84 receives pulses t which are applied to the shift register 120. Via the output $t_2-t_8$ of the shift register 120, the pulses t control buffer circuits which are denoted only by arrows $t_1, t_2 \ldots t_7, t_8, t_9$ in the FIGS. 9a, 9b and 10 for the sake of clarity. The buffer circuits (latch circuits) are included in each segment 81 and serve to prevent a calculation in an arbitrary part of the segment 81 from being disturbed by a calculation in a preceding part thereof. During the period between the pulses t each part of the segment 81 "sees" its "own" input variables stored in the preceding buffer. As follows from the FIGS. 9a, 9b and 10, only after the ninth pulse $t_9$ (eleven pulses in the case of FIG. 9b) a contribution $\Delta f(x_o, y_o)$ associated with an address $x_o$, $y_o$ will have been calculated in order to be available on the output of the counter 82. This contribution $\Delta f(x_o, y_o)$ is to be added to the content of the address $x_o$, $y_o$. The x-y address applied to the memory control circuit 83 by the pipeline control circuit 84 is formed by two counters 121 and 122; the counter 121 generates the x-address and via its output it controls the counter 122 which generates the y-address. The counters 121 and 122 operate actually in the same way as the counters 100a and 100b of FIG. 10 and they operate in synchronism therewith. However, the pulses t applied to the counters 100a and 100b are delayed by the shift register 120 through nine pulse durations ($t_1-t_9$), so that the counters 100a and b have already received eight pulses when the counter 121 receives its first pulse. The counters 121 and 122 thus lag the counters 100a and 100b by eight "addresses", so that the counters 121 and 122 generate the x-y address exactly at the instant at which the associated calculated contribution $\Delta f(x-y)$ becomes available on the output of the adder 82. The delayed pulses $t_9$ applied to the counter 121 are also applied to the memory control circuit 83 in order to activate this circuit. FIG. 12 shows an indication "$t_1$" on the control line 123 to the counters 100a and b and on the control line 124 to the circuit 83 an indication "$t_9$" in order to illustrate the time delay exerted on the control pulses t by the shift register 120. It is to be noted that the convolution device 16a (FIG. 7) and the back-projection device 16b (FIGS. 8, 9a, b, 10) can be simply switched over so that (measured data determined along parallel measuring paths can also be processed. To this end, the (pre-conditioning) factor $\cos(\sigma_k)$ and the value $B_o$ (see FIG. 9a and FIG. 10) are made equal to 1 (modification of the content of the buffer 101b and blocking of the outputs of the adder 107b). The foregoing is important notably when a correction is performed concerning the radiation hardening effect. Such a correction is described in U.S. Pat. No. 4,217,641, in which correction data are determined from the already reconstructed image. The data are then obtained easiest along (measuring) paths which extend parallel (and equidistantly) through the reconstructed image (see U.S. Pat. No. 3,778,614), so that a correction/reconstruction should take place along the same (measuring) paths. This requirement is completely satisfied by the computer tomography apparatus in accordance with the invention.

What is claimed is:

1. In a method for determining a radiation attenuation distribution in a body section by the methods of computed tomography which comprises: irradiating the body section from a plurality of source positions which are disposed around the body section with a flat, fan-shaped beam of penetrating radiation, said beam diverging from each source position and having a central ray which passes through a central point situated within the body section; for each of said source positions, measuring a data group of data elements, each data element being respectively a measure of the radiation attenuation along an associated measuring path which is situated in the beam on a line which connects the source position to an associated one of a plurality of detector positions which are distributed on the opposite side of the body from the source position; mathematically combining each data group, either (a) by convolution with a group of convolution numbers or (b) by Fourier transformation, filtering, and back-transformation; and back-projecting the data thus combined into elements of a matrix of pixels, the improvement comprising the steps of:

prior to said combining step, pre-conditioning the data by multiplying each data element by a pre-conditioning factor which is a function of the cosine of the angle enclosed between the central ray and the measuring path associated with said data element;

then combining the pre-conditioned data elements by either convolution or by Fourier transformation, filtering and back-transformation as if the pre-conditioned data elements had been measured along parallel measuring paths;

then post-conditioning the data by multiplying each combined data element by a post-conditioning factor which is inversely proportional to the variation of the angle enclosed between the central ray and the associated measuring path and which is proportional to the square of the cosine of said angle; and then back-projecting each of said post-conditioned data elements along the same measuring path on which the corresponding original data element was measured.

2. The improvement claimed in claim 1 further comprising the step of multiplying the combined data elements, prior to said back-projection step, by a distance factor which is inversely proportional to the distance between the source position and a point on the central ray which is the projection of the pixel into which the post-conditioned data element is to be back-projected.

3. The improvement claimed in claim 1 in which the distance $R_2$ which is the distance between the central point and the source position is not equal to the distance $R_1$ which is the distance between the central point and the detector positions, in which the source positions are equiangularly situated with respect to the central point and in which, at each detector position, a set of data elements is measured along a set of paths which diverge from the detector position wherein, as an improvement, the pre-conditioning factor $Q(k)$ is:

$$Q(k) = \frac{v + \cos(k \cdot \Delta\alpha)}{v^2 + 1 + 2v \cdot \cos(k \cdot \Delta\alpha)}$$

where v is the quotient of the distance $R_1$ divided by the distance $R_2$, and $k \cdot \Delta\alpha$ is the acute angle enclosed between (a) the line connecting the associated detector position and the central point and (b) a line connecting the central point and the associated source position; and the post-conditioning factor $Q(k)$ is:

$$Q(k) = \frac{v^2 + 1 + 2v \cdot \cos(l \cdot \Delta\alpha)}{(1 + v \cdot \cos(l \cdot \Delta\alpha))}$$

wherein $l \cdot \Delta\alpha$ is the angle enclosed between (a) the line connecting the associated detector position and the central point and (b) the line connecting the central point and the associated source position, and $\Delta\alpha$ is the angle enclosed by lines which extend from the central point to two successive source positions.

4. In a method for determining a radiation attenuation distribution in a body section using the methods of computed tomography which comprises: irradiating the body section from a plurality of source positions with a flat fan-shaped beam of penetrating radiation which diverges from each source position and has a central ray which extends from the source position through a central point which is situated within the body section; for each of said source positions measuring a data group of data elements, each of which is a measure of the radiation attenuation along an associated one of a group of diverging measuring paths situated in the beam; then forming sub-groups from said data elements which are associated with measuring paths which extend substantially parallel to one another; then convolving and back-projecting the data elements in each sub-group into elements of a matrix of pixels along the measuring paths associated with said sub-group; the improvement comprising:

the step of multiplying the convolved data elements by a post-conditioning factor which is inversely proportional to the variation of the distance $(dr(l)/dl)$ between the associated measuring path and the central point.

5. The improvement claimed in claim 4 wherein the measuring paths are equiangularly distributed within the beam and the post-conditioning factor is further inversely proportional to the cosine of the angle enclosed by the central ray and the associated measuring path along which the measurement of the post-conditioned data element was taken.

6. In a device for determining a radiation attenuation distribution in a slice of a body by the methods of computed tomography comprising: source means which irradiate the body with a flat, fan-shaped beam of penetrating radiation along a plurality of measuring paths which diverge from a plurality of source positions and which are situated in the body slice, the source positions being regularly distributed around the body slice over at least 180° so that from each source position a central ray in the fan-shaped beam passes through a central point in the body slice; detector means including an array of detectors which detect radiation which has passed through the body along the measuring paths and supply, for each source position, a data group of data elements, each of which is a measure of the radiation attenuation occurring along an associated measuring path; data processing means which include a memory for storing the data; filtering means which filter the elements in each data group; memory matrix means for storing the sum of back-projected, filtered data elements; back-projection means which back-project and assign the elements of the filtered data groups from the output of the filtering means to pixel elements of the memory matrix means; and display means which display the sum of the back-projected data from the memory matrix means; the improvement wherein, the device further comprises:

first arithmetic means, functionally situated between the detector means the filtering means, which multiply the elements in each data group by a pre-conditioning factor which is a function of the cosine of the angle enclosed between the associated measuring path and the central ray and;

second arithmetic means, functionally situated between the filtering means the back-projection means, which multiply each filtered data element by a post-conditioning factor which is inversely proportional to the variation of the angle enclosed between the central ray and the associated measuring path and which is proportional to the square of the cosine of said angle;

wherein the filtering means are adapted for filtering parallel and equidistantly measured data elements; and the back-projection means device comprises means for multiplying a filtered post-condition data element by a distance factor which is inversely proportional to the square of the distance between the associated source position and the projection point of the associated back-projection pixel on the central ray.

7. The improvement of claim 6 wherein the filtering means is wholly implemented in electronic hardware.

* * * * *